US011171990B1

(12) United States Patent
Yenamandra et al.

(10) Patent No.: US 11,171,990 B1
(45) Date of Patent: Nov. 9, 2021

(54) ARBITRATED NETWORK ACCESS USING REAL-TIME RISK METRIC

(71) Applicant: Entreda, Inc., Santa Clara, CA (US)

(72) Inventors: Siddharth Yenamandra, Los Altos, CA (US); Farshad Ghaffari, San Francisco, CA (US)

(73) Assignee: Entreda, Inc., Santa Clara, CA (US)

( * ) Notice: Subject to any disclaimer, the term of this patent is extended or adjusted under 35 U.S.C. 154(b) by 231 days.

(21) Appl. No.: 16/178,516

(22) Filed: Nov. 1, 2018

Related U.S. Application Data

(60) Provisional application No. 62/580,399, filed on Nov. 1, 2017.

(51) Int. Cl.
*H04L 29/06* (2006.01)

(52) U.S. Cl.
CPC .......... *H04L 63/20* (2013.01); *H04L 63/0272* (2013.01); *H04L 63/0876* (2013.01); *H04L 63/1433* (2013.01)

(58) Field of Classification Search
CPC ... H04L 63/20; H04L 63/205; H04L 63/0272; H04L 63/0872; H04L 63/1433
USPC ............................................................ 726/6
See application file for complete search history.

(56) References Cited

U.S. PATENT DOCUMENTS

| | | | | |
|---|---|---|---|---|
| 8,286,002 B2 * | 10/2012 | Kamat | ................ | H04L 63/0281 713/192 |
| 8,316,438 B1 * | 11/2012 | Bush | ....................... | H04L 12/66 726/22 |
| 8,370,905 B2 * | 2/2013 | Sangubhatla | ....... | H04L 63/0823 726/4 |
| 9,767,262 B1 * | 9/2017 | Canavor | ............... | H04L 9/3226 |
| 10,200,369 B1 * | 2/2019 | Roundy | ................. | H04L 63/10 |
| 10,277,619 B1 * | 4/2019 | Clark, II | ............... | G06F 21/577 |
| 10,362,019 B2 * | 7/2019 | Canavor | ............ | H04L 63/0853 |
| 2007/0143851 A1 * | 6/2007 | Nicodemus | ........... | G06F 21/577 726/25 |
| 2010/0125911 A1 * | 5/2010 | Bhaskaran | ............. | G06Q 10/10 726/23 |
| 2010/0138534 A1 * | 6/2010 | Mutnuru | ............. | H04L 43/0817 709/224 |
| 2011/0231910 A1 * | 9/2011 | Mohanty | ............... | H04L 63/168 726/6 |
| 2013/0227712 A1 * | 8/2013 | Salem | ................. | G06F 21/6218 726/30 |
| 2017/0201545 A1 * | 7/2017 | Nicodemus | ............. | G06F 21/55 |
| 2018/0034842 A1 * | 2/2018 | Smyth | .................... | G06N 20/00 |
| 2018/0137288 A1 * | 5/2018 | Polyakov | .............. | G06F 21/577 |
| 2019/0158507 A1 * | 5/2019 | Belz | .................... | H04L 63/0853 |
| 2019/0297071 A1 * | 9/2019 | Canavor | ................ | H04L 63/08 |
| 2020/0004938 A1 * | 1/2020 | Brannon | ............... | G06F 21/316 |

\* cited by examiner

*Primary Examiner* — Dant B Shaifer Harriman
(74) *Attorney, Agent, or Firm* — Morris, Manning & Martin, LLP; Daniel E. Sineway; Adam J. Thompson (57) ABSTRACT

A security system within a digital network receives a request to access a feature of the digital network from a remote computing device. The security system obtains obtains characteristic data corresponding to the remote computing device and generates a security score corresponding to the remote computing device based at least in part on the characteristic data. The security system compares the security score to an access threshold, allowing the remote computing device to access to the feature of the digital network if the security score exceeds the access threshold.

19 Claims, 6 Drawing Sheets

FIG. 4    * All communication occurs over secure web services

| NIST | Decision Factors / Defaults / Components | | Automated (A) / User Input : Manual (M) | Risk Weights / Pts |
|---|---|---|---|---|
| Identify | # of devices | Over 10 | A (some user input) | 30 |
| Identify | # of locations | Over 2 | A | 20 |
| Identify | One or more on premise servers (physical or virtual) | On-premise servers | A | 20 |
| Identify | Home or Basic editions (non-pro) of device OS | Home editions of OS | A | 20 |
| Identify | Early adopter of newly released operating systems | Newly released OS are more vulnerable | A | 10 |
| Protect | Auto screenlocks not set | At least 15 mins | A | 10 |
| Protect | Client firewall disabled | No client firewall detected or enabled | A | 10 |
| Protect | Anti-virus not installed | Non white-listed app is considered FAIL | A | 20 |
| Protect | Anti-virus auto-update | Non White-listed app will require user input | A (some user input) | 20 |
| Protect | VPN software not installed | Non white-listed | A | 20 |
| Protect | Password policy does NOT meet min standard | Default password policy (8 char., alpha numeric and one letter, number) | A | 20 |
| Protect | New apps installed | More than 5 per week | A | 10 |
| Protect | New processes running | More than 10 new process changes per week | A | 20 |
| Protect | Peer to Peer Software detected | White listed applications detected | A | 30 |
| Protect | OS patches not applied | Critical patches not completed | A | 20 |
| Detect | OS not set to auto-update | More than 30 days | A | 20 |
| Protect | Disk encryption on devices not installed | All devices that have a risk classification of high | A | 20 |
| Detect | Lots of unaccounted or unauthorized devices | With no Unity applet installed on them | A | 20 |
| Detect | USB, dropbox or 3rd party social media use | More than 1 | A | 10 |
| Detect | # of external facing IP addresses | More than 2 | A (some user input) | 20 |
| Detect | Network Firewall detected (open ports) | More than 4 | A | 30 |
| Detect | # of critical or high vulnerabilities found from security scanning | More than 2 | A (some user input) | 30 |
| Detect | HIDS alerts detected | More than 3 | A (some user input) | 30 |
| Identify | Multiple acts with admin privileges | More than 5 | A | 30 |
| Respond | User declines auto-remediate messages | More than 3 times | A | 20 |
| Respond | Remediations not fixed after 30 days | | A (some user input) | 10 |
| Respond | Remediations not fixed after 60 days | | A (some user input) | 30 |
| Detect | Phishing attack data | More than 2 users clicked on links | A | 30 |
| Detect | Backup software not detected or enabled | Non-white listed application or process | A | 10 |
| Detect | Android OS detected | | A | 20 |
| Detect | Mobile pin code not set | Tied to Pin code in iOS | A | 30 |
| Detect | Mobile encryption not enabled | Supported with MDM / Advanced Mobile App | A | 10 |
| Detect | Mobile OS auto-update status | Supported with MDM / Advanced Mobile App | A | 10 |
| Detect | Black listed mobile applications | Supported with MDM / Advanced Mobile App | A | 10 |
| Detect | Non-secure Wi-Fi on mobile device | Supported with MDM / Advanced Mobile App | A | 10 |
| Identify | Mobile Apps most susceptible to hacks detected | | A | 20 |
| Identify | 3rd Party Vendor Risk Management not complete | More than 50% | A | 20 |
| Protect | Security Awareness training not completed | More than 50% | A | 30 |
| Recover | Breach incident submitted | More than 2 | A | 30 |
| Identify | Cybersecurity policy NOT completed | No cybersecurity policy completed | A (some user input) | 20 |
| | | | Total Weighted risk index | 600 |

User or Service-level Cyber Risk Score: (0 to 800)

Cyber Risk Score = 800 - total weighted risk index

Firm Cyber Risk Score
User Cyber Risk Percentile
Industry-wide Cyber Risk Score
Firm Cyber Risk Percentile Sum of All User Cyber Risk Scores/Total number of devices registered
User Cyber Risk Score/Firm cyber risk score * 100
Sum of all Firm Wide Risk Scores/Total number of firms signed up
Firm Cyber Risk Score / Industry Wide Cyber risk score * 100
* If the app is not able to automatically verify then we will assume 10 pts

ARBITRATED NETWORK ACCESS USING REAL-TIME RISK METRIC

CROSS REFERENCE TO RELATED APPLICATIONS

This application hereby claims priority to and incorporates by reference U.S. Provisional Application No. 62/580,399, filed Nov. 1, 2017.

TECHNICAL FIELD

The disclosure herein relates to network security.

INTRODUCTION

Organizations today can verify that users are granted access to corporate web applications, databases and/or services using multi-factor authentication techniques such as a user-set combination of username and password, biometrics and/or OTP (one-time password). However, many organizations want to ensure that users are granted access to corporate web applications, databases and or services based on a user's conformance with the organization's information security policies. The reasons for this range from enforcing a culture of cybersecurity within an organization to restricting access to only those end-point devices and users that are following corporate compliance rules. Now achieving this goal of arbitrating access based on end-user cybersecurity posture is highly difficult to implement in most organizations, for the following reasons:

A user's information security posture is found in fragmented information security systems and tools;

A lack of a standardized metric to determine the holistic information security risk posture of an individual user or an organization;

A method to arbitrate user access in real-time based on this standardized information security risk posture when integrated with corporate web applications, databases and other types of services.

DRAWINGS

The various embodiments disclosed herein are illustrated by way of example, and not by way of limitation, in the figures of the accompanying drawings and in which like reference numerals refer to similar elements and in which.

DETAILED DESCRIPTION

In a number of embodiments presented herein, online systems that arbitrate access to online portals or services (e.g., web applications, databases, services, etc.) based on end-user cybersecurity posture include, without limitation, the following three elements:

1. A unified information security-posture management module to gather data on a user and organization's information security risk posture in real-time. This module itself consists of three components:
   a. End-point Data Collector serves the function of information security data gathering and acting as a point of enforcement for the organization's information security posture. The End-point data collector is an agent that runs on physical compute devices such as a PC, MAC, Servers, embedded devices (x86 or ARM-based), mobile devices supporting iOS, Android, Linux, Windows operating systems or virtual machines (VMs).
   b. Data Repository is a database server that collects all data from the end-point agent.
   c. User Portal is a Web application server that supports business logic, user registration and reporting. All User interactions or policy settings occurs through the user portal.
2. Cybersecurity Risk Analytics Engine is an application server that supports statistical modeling such as weighted average calculation based on the data collected from the unified platform and users.
3. Unify Authentication API programmatically enforces fine-grained end-user and end-point level cybersecurity compliance policies for SaaS applications or network services. With the integration of the Unify Authentication API, any application can add an additional step or factor of authentication to ensure that end-users and end-point devices meet minimum cybersecurity compliance policy requirements. Using this service, web applications are able to enforce the following policies automatically:
   a. Device is known and is being actively monitored
   b. Device meets and exceeds cybersecurity policy requirements (device is secure).

Figure 1A:
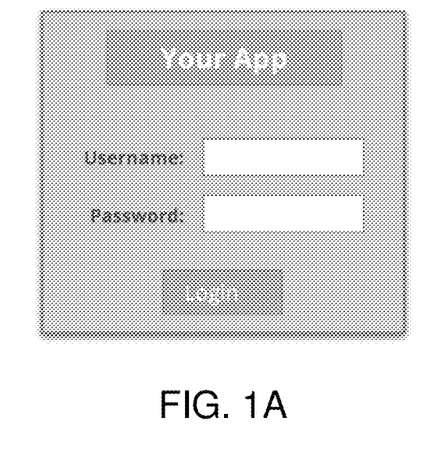
FIGS. 1A-1D illustrate exemplary login, applet validation, cloud-server validation and login-success prompts and images displayed to a user of a remote computing device seeking access to a feature of a digital network.
Figure 1B:
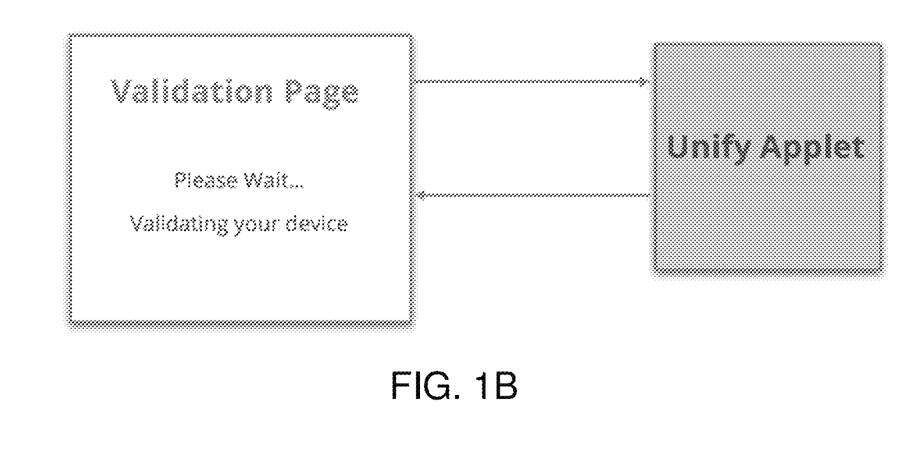
Figure 1C:
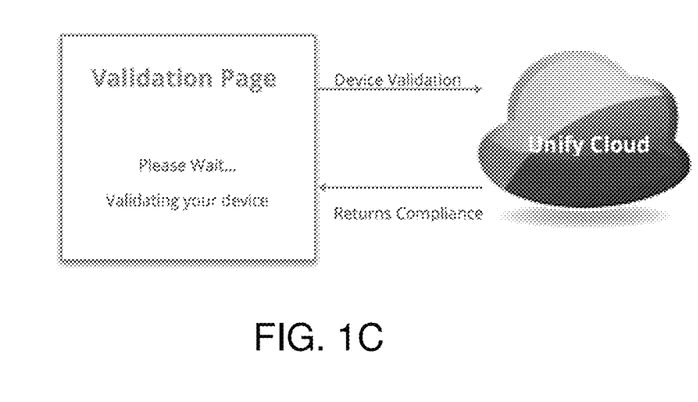

An exemplary workflow for enforcement of the security compliance and validation of the device is detailed below.
1. User logs into an enterprise application (see FIG. 1A);
2. User is redirected to a "Unify Authentication" cloud (i.e., a cloud server);

3. A "Unify Applet" installed on the end-user's device is queried by the Unify Authentication cloud to make sure that the app is installed successfully and validated (see FIG. 1B);
4. The Unify Authentication cloud returns a cyber score along with details of the device cybersecurity posture (see FIG. 1C); and
5. Based on the results, the user login is either successful (allowed) or a failure (blocked, denied). More specifically if the end-user's device meets the stipulated requirements, the user is redirected to a "Success Page" (see FIG. 1D) and the user is able to access the enterprise application (this will be your application's main page).

Figure 1D:
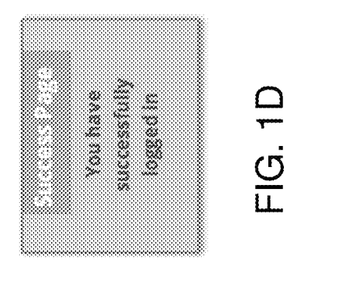

The "Success Page" shown in FIG. 1D is specified during initial application on-boarding. If the login fails, the user will be directed to a "Failure page"—also specified during initial application on-boarding. There are generally two reasons for a login failure: (i) the end-user's device does not have the Unify applet installed, or (ii) the end-user's device is below the cyber score threshold.

Figures 2A, 2B:
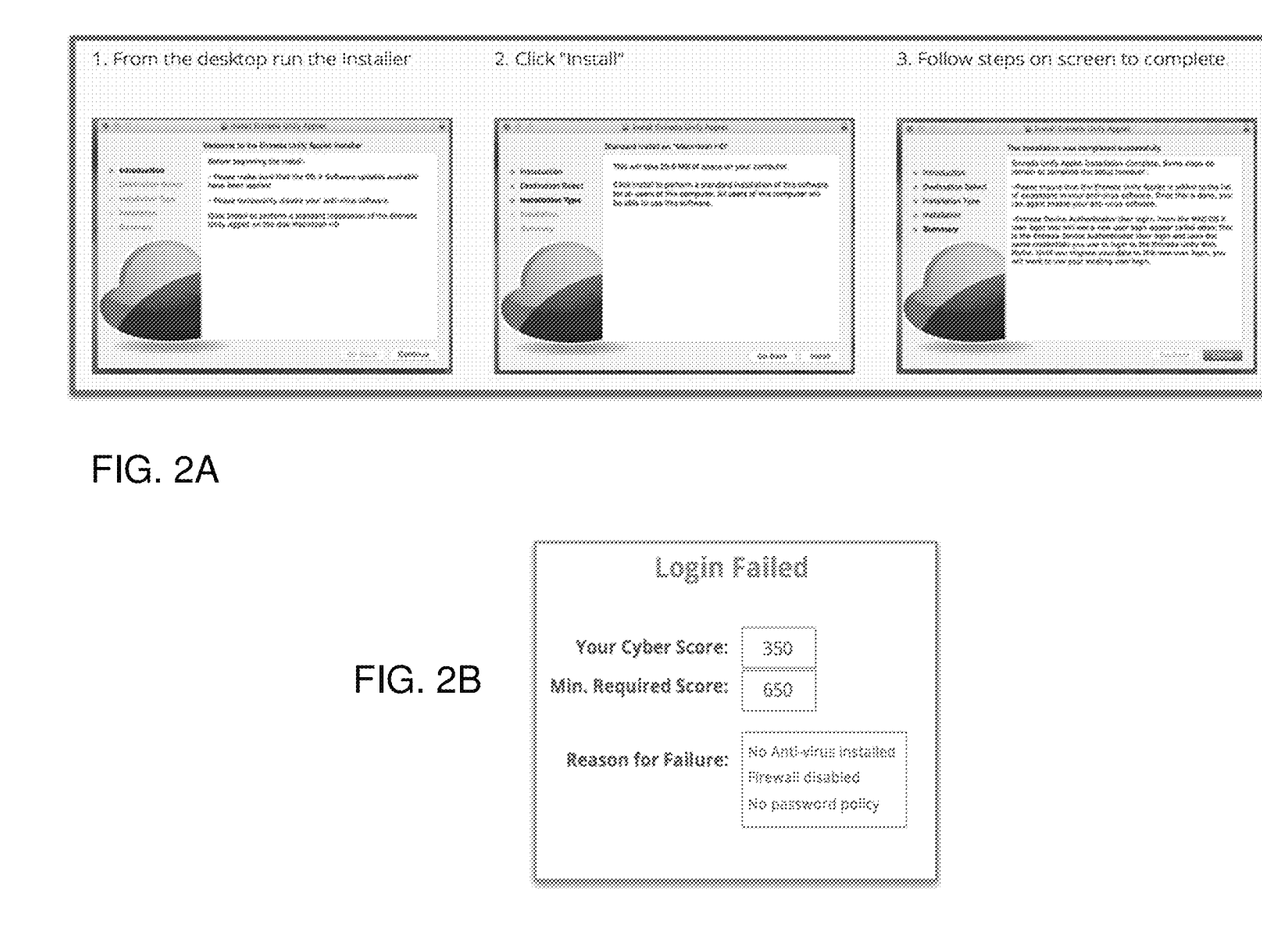
FIG. 2A illustrates exemplary prompts and images to assist a user of the remote computing device in installation of an applet required to successfully access the feature of the digital network.
FIG. 2B illustrates an exemplary login failure message displayed to a user of the remote computing device (i.e., via a display thereof) if a security score (cyber score, risk score) fails to meet a required threshold—resulting in denial of access to the subject feature of the digital network.

If the user's device doesn't have the Unify applet installed, the user can optionally be guided to a Unify portal to install the applet (see FIG. 2A). If the user's device is below the cyber score threshold, the user will get a notification as shown in FIG. 2B, presenting the user's cyber score along with how to rectify non-compliances before accessing the site.

In a number of embodiments, there are two steps to on-board an application: (i) simple integration using the Unify application programming interface (API), and (ii) registration of the application with Unify.

In on-boarding step 1 (i.e., integration using Unify API), three API calls are to be integrated:
1. Launch Device Validation Module: This API will be called by the subject application (i.e., application being on-boarded) to perform device validation.
2. Success URL: This API will be created by the subject application. It will be called by the Device Validation Module if the device has been successfully validated. This API should redirect user to your application's main page.
3. Failure URL: This API will be created by the subject application. It will be called by the Device Validation Module if the device validation fails for any reason. This API should redirect the user to an error page which logs the user out of the customer's app.

Sample code is provided below:

```
Device Validation Module:
import java.io.IOException;
import javax.servlet.ServletException;
import javax.servlet.annotation.WebServlet;
import javax.servlet.http.HttpServlet ;
import javax.servlet.http.HttpServletRequest;
import javax.servlet.http.HttpServletResponse;
import javax.ws.rs.client.Client;
import javax.ws.rs.client.Entity;
import javax.ws.rs.core.MediaType ;
import javax.ws.rs.core.Response;
import org.glassfish.jersey.client.ClientProperties ;
@WebServlet("/launch")
public class LaunchServlet extends HttpServlet {
    private static final long serialVersionUID = 1L;
    public LaunchServlet( ) {
        super( ) ;
    }
    @Override
    protected void doGet(HttpServletRequest req, HttpServletResponse resp) throws ServletException, IOException {
        ClientDTO = new ClientDTO( );
        clientDTO.setApiKey("914a530e-7384-11e7-8cf7-a6006ad3dba0") ;
        clientDTO.setRequestId("914a55ac-7384-11e7-8cf7-a6006ad3dba0") ;
        clientDTO.setUserId("userId") ;
        JerseyWithSSL ssl = new JerseyWithSSL( ); Client = null;
        try {
            client = ssl.initClient( );
        } catch (Exception e) {
            e.printStackTrace( ) ;
        }
        Response res = client.target ("https://localhost:8443/api/validate/device")
            .property(ClientProperties.FOLLOW_REDIRECTS,
            Boolean.FALSE).request( )
            .post (Entity.entity(clientDTO, MediaType.APPLICATION_JSON));
```

Sample code is provided below:

```
      resp.setStatus (res.getStatus( ));
      resp.setHeader ("Location", res.getHeaderString("Location"));
    }
  }
}
import Java.security.KeyManagementException; import Java.security.NoSuchAlgorithmException; import Java.security.SecureRandom;
import Java.security.cert.CertificateException;
import Java.security.cert.X509Certificate;
import javax.net.ssl.HostnameVerifier ;
import javax.net.ssl.SSLContext; import javax.net.ssl.SSLSession; import javax.net.ssl.TrustManager;
import javax.net.ssl.X509TrustManager ;
import javax.ws.rs.client.Client;
import javax.ws.rs.client.ClientBuilder;
public class JerseyWithSSL {
  public Client initClient( ) throws NoSuchAlgorithmException,
      KeyManagementException { SSLContext ctx =
      SSLContext.getInstanc ("SSL");
      ctx.init(null, certs, new SecureRandom( )) ;
      return ClientBuilder.newBuilder( ).hostnameVerifier(new
TrustAllHostNameVerifier( )).sslContext(ctx).build( );
  }
  TrustManager[ ] certs = new TrustManager[ ] { new X509TrustManager( ) {
      @Override
      public X509Certificate[ ] getAcceptedIssuers( ) {
        return null;
      }
      @Override
      public void checkServerTrusted(X509Certificate[ ] chain, String authType) throws
CertificateException {
      }
      @Override
      public void checkClientTrusted(X509Certificate[ ] chain, String authType) throws
CertificateException {
      }
} };
  private class TrustAllHostNameVerifier implements HostnameVerifier {
      public boolean verify(String hostname, SSLSession session) {
        return true;
      }
  }
}
Success URL:
import java.io.BufferedReader;
import java.io.IOException;
import javax.servlet.ServletException;
import javax.servlet.annotation.WebServlet ;
import javax.servlet.http.HttpServlet;
import javax.servlet.http.HttpServletRequest;
import javax.servlet.http.HttpServletResponse;
import org.json.JSONObject;
@WebServlet("/success")
public class SuccessServlet extends HttpServlet {
  private static final long serialVersionUID = 1L;
  public SuccessServlet( ) {
    super( ) ;
  }
  protected void doPost(HttpServletRequest request, HttpServletResponse response)
        throws ServletException, IOException {
      StringBuilder sb = new
      StringBuilder( ); BufferedReader br
      = request.getReader( ); String str
      = null;
      while ((str = br.readLine( ) ) != null) {
        sb.append(str);
```

Sample code is provided below:

```
            }
            JSONObject jObj = new
            JSONObject(sb.toString( ) ); String
            requestId = jObj.getString("requestId");
            // IMPORTANT NOTE ! ! ! !
            // requestId should be validated here with what was sent earlier to
            // make sure that they are the
            same if (requestId != null)
            {response.sendRedirect("https
            ://localhost:9090/ClientDemo/
            success.jsp") ;
            }
        }
    }
}
Failure URL:
import java.io.BufferedReader;
import java.io.IOException;
import
javax.servlet.ServletException;
import
javax.servlet.annotation.WebServlet
; import
javax.servlet.http.HttpServlet;
import javax.servlet.http.HttpServletRequest;
import javax.servlet.http.HttpServletResponse;
import org.json.JSONObject
@WebServlet("/failed")
public class FailureServlet extends HttpServlet {
    private static final long serialVersionUID = 1L;
    public FailureServlet( ) {
        super( ) ;
    }
    protected void doPost(HttpServletRequest request, HttpServletResponse response)
            throws ServletException, IOException {
        StringBuilder sb = new
        StringBuilder( ); BufferedReader
        br = request.getReader( ); String
        str = null;
        while ((str = br.readLine( )) != null) {
            sb.append(str);
        }
        JSONObject jObj = new
        JSONObject(sb.toString( )); String
        requestId = jObj.getString("requestId");
        // IMPORTANT NOTE ! ! ! !
        // requestId should be validated here with what was sent earlier to
        // make sure that they are
        the same if (requestId !=
        null) {
            response.sendRedirect( "https://localhost:9090/ClientDemo/failure.jsp ");
        }
    }
}
```

Figure 3A:
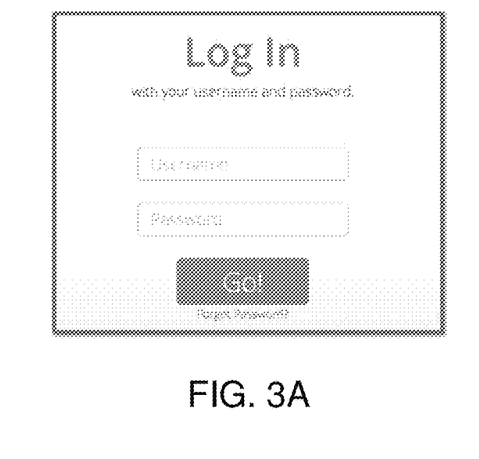
FIGS. 3A-3D illustrate exemplary prompts and images to guide user registration of an application with the digital network to enable security-arbitrated access thereto.
Figure 3B:
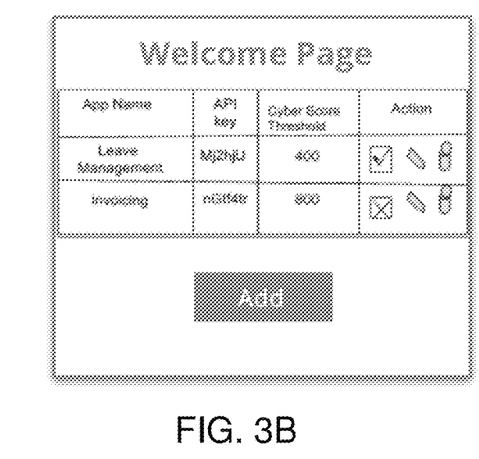
Figure 3C:
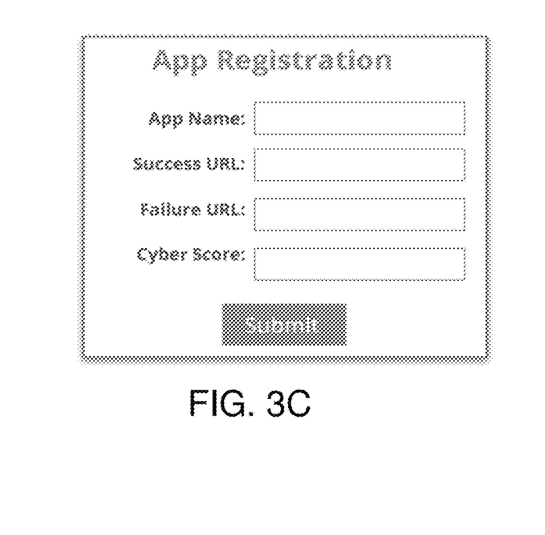
Figure 3D:
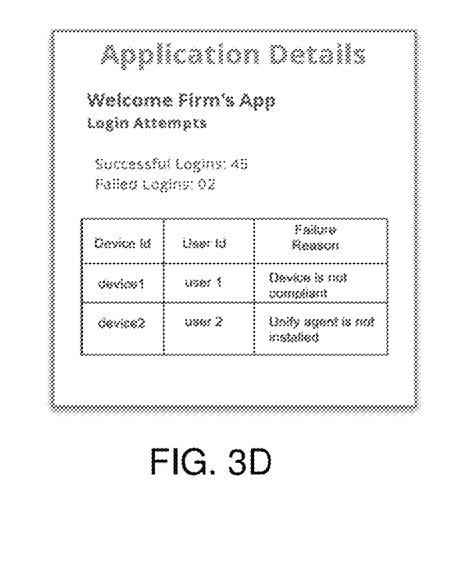

In on-boarding step 2 (i.e., registration of the application with Unify), the user logs in to Unify (e.g., at https://unify.entreda.com) using his or her Partner/Broker-Dealer (CA) credentials (see FIG. 3A), and then navigates to "Preferences>Application Registration," yielding the registration page shown in FIG. 3B. To register a new application, the user clicks "Add" (i.e., within the FIG. 3B registration page) and then enters the App Name, Success URL, Failure URL, and Cyber Score Threshold (i.e., in the dialog box shown in FIG. 3C). Upon clicking "Submit" in the FIG. 3C dialog box, a unique API key is generated for the application being registered and will be used in API calls by that application. Upon clicking "Application Details" the user is presented with a list of application details, including failed login attempts and reasons for the failed login attempts (see FIG. 3D, for example).

Figure 4:
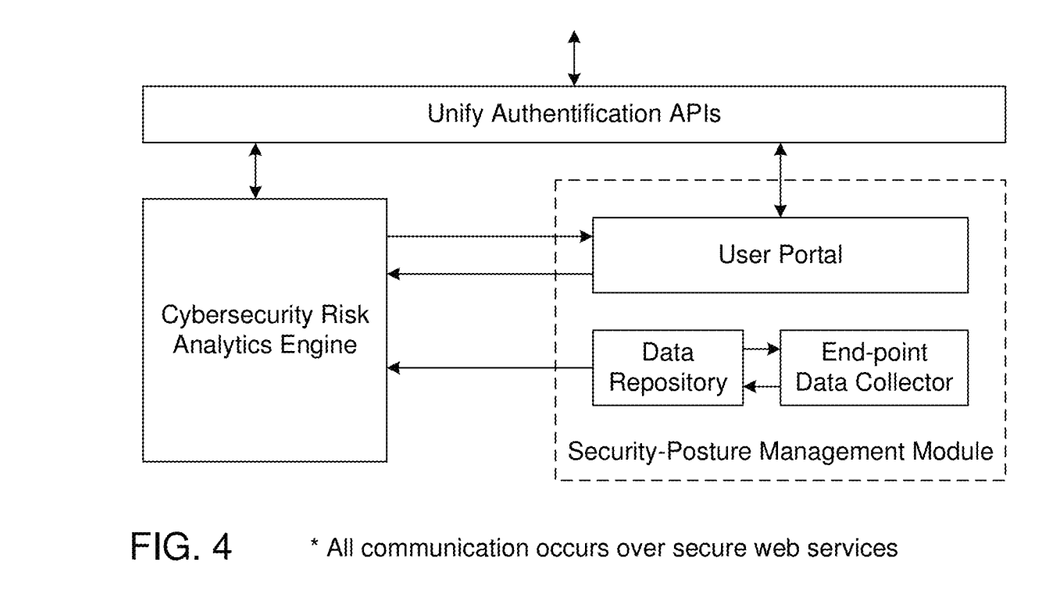
FIG. 4 presents a conceptual diagram of an access-arbitration engine, including a security-posture management module (having an end-point data collector, data repository and user portal components), cybersecurity risk analytics engine and unify authentication APIs (application programming interfaces)

FIG. 4 presents a conceptual diagram of the access-arbitration engine discussed above, including the security-posture management module (having the above-described end-point data collector, data repository and user portal components), cybersecurity risk analytics engine and unify authentication APIs.

Figure 5:
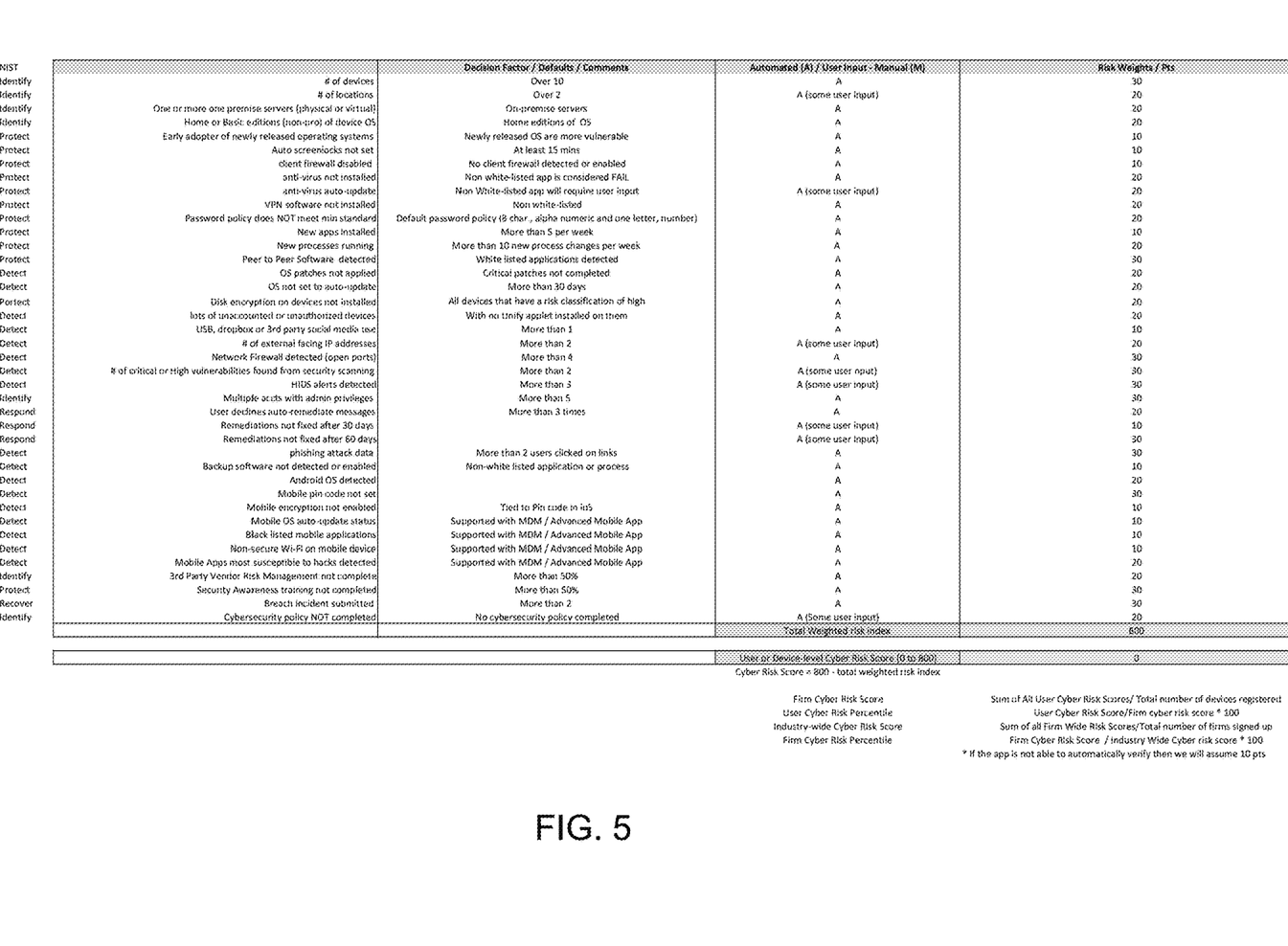
FIG. 5 illustrates an exemplary set of configurable risk weights and risk criteria employed by the cybersecurity risk analytics engine to generate a real-time (dynamic) statistically modeled "risk score" (or security score or cyber score) based on the data calculated from the unified platform and users.

FIG. 5 illustrates an exemplary set of configurable risk weights and risk criteria employed by the cybersecurity risk analytics engine to generate a real-time (dynamic) statistically modeled "risk score" (or security score) based on the data calculated from the unified platform and users.

Figure 6:
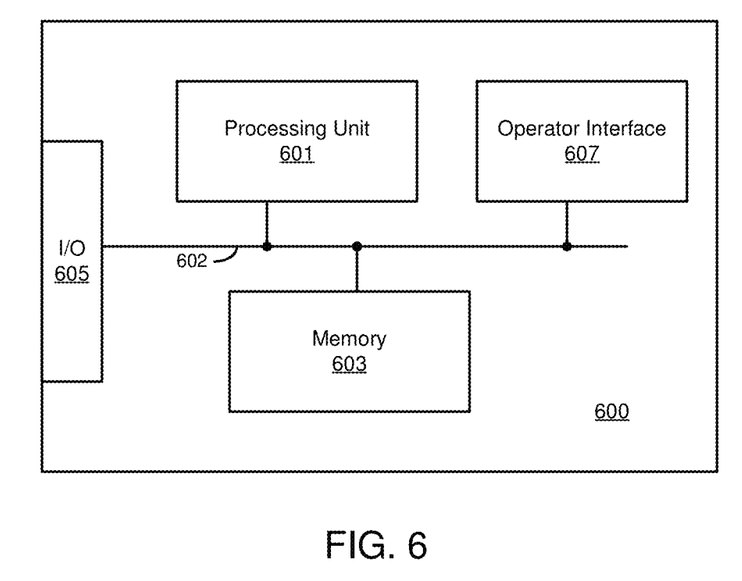
FIG. 6 illustrates a generalized embodiment of a computing device that may be used to implement the various servers, clients, appliances, databases, APIs, or other device instantiations presented with respect to FIGS. 1-5, including the access-arbitration engine shown in FIG. 4 or any component(s) thereof.

FIG. 6 illustrates a generalized embodiment of a computing device 600 that may be used to implement the various servers, clients, appliances, databases, APIs, or other device instantiations in which the various operations described above may be executed, including the access-arbitration engine shown in FIG. 4 or any component(s) thereof. As shown, computing device 600 includes a processing unit 601, memory 603 for storing program code executed by the processing unit to effect the various methods and techniques of the above-described embodiments, and also to configuration data or other information for effecting various programmed or configuration settings in accordance with the embodiments described above. Note that the processing unit itself may be implemented by a general or special purpose processor (or set of processing cores) and thus may execute sequences of programmed instructions to effectuate the various operations described above, as well as interaction with a user, system operator or other system components.

Computing device 600 further includes one or more input and/or output (I/O) ports 605 for receiving and outputting data (e.g., various wireless communications interfaces in accordance with communications standards referenced above), and a user interface 607 to present (display) and receive information to a human or artificial operator and thus enable an operator to control server-side and/or client-side inputs in connection with the above-described operations. Though not shown, numerous other functional blocks may be provided within computing device 600 according to other functions it may be required to perform and the computing device itself may be a component in a larger device, server or network of devices and/or servers. Further, the functional blocks within computing device 600 are depicted as being coupled by a communication path 602 which may include any number of shared or dedicated buses or signaling links. More generally, the functional blocks shown may be interconnected in a variety of different architectures and individually implemented by a variety of different underlying technologies and architectures. With regard to the memory architecture, for example, multiple different classes of storage may be provided within memory 603 to store different classes of data. For example, memory 603 may include non-volatile storage media such as fixed or removable magnetic, optical, or semiconductor-based recording media to store executable code and related data, volatile storage media such as static or dynamic RAM to store more transient information and other variable data.

The various methods and techniques disclosed herein may be implemented through execution of one or more a sequences of instructions (i.e., software program(s)) within processing unit 601, or by a custom-built hardware ASIC (application-specific integrated circuit), or programmed on a programmable hardware device such as an FPGA (field-programmable gate array), or any combination thereof within or external to processing unit 601.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of components, communication techniques, component types or devices and the like can be different from those described above in alternative embodiments. The term "coupled" is used herein to express a direct connection as well as a connection through one or more intervening circuits or structures. Device or circuit "programming" can include, for example and without limitation, loading a control value into a register or other storage circuit within the device in response to a host instruction (and thus controlling an operational aspect of the device and/or establishing a device configuration) or through a one-time programming operation. The terms "exemplary" and "embodiment" are used to express an example, not a preference or requirement.

Any section headings provided in this description are for convenience of reference only, and in no way define, limit, construe or describe the scope or extent of such sections. Also, while various specific embodiments have been disclosed, it will be evident that various modifications and changes may be made thereto without departing from the broader spirit and scope of the disclosure. For example, features or aspects of any of the embodiments may be applied in combination with any other of the embodiments or in place of counterpart features or aspects thereof. Accordingly, the specification and drawings are to be regarded in an illustrative rather than a restrictive sense.

What is claimed is:

1. A method of providing conditional access to a feature of a digital network, the method comprising:
   receiving, from a remote computing device, a request to access to the feature of the digital network, wherein the feature comprises a web application;
   obtaining characteristic data corresponding to the remote computing device, wherein the characteristic data comprises information that is:
   collected via a user, and
   calculated from the remote computing device including whether anti-virus software is operative within the remote computing device and vulnerabilities found from a security scan;
   generating a security score corresponding to the remote computing device based at least in part on the characteristic data;
   comparing the security score to an access threshold; and
   granting the remote computing device access to the feature of the digital network if the security score exceeds the access threshold.

2. The method of claim 1 wherein the characteristic data corresponding to the remote computing device further comprises information indicating whether a firewall is operative within the remote computing device.

3. The method of claim 1 wherein the characteristic data corresponding to the remote computing device further comprises information indicating whether a virtual private network (VPN) service is operative within the remote computing device.

4. The method of claim 1 wherein the characteristic data corresponding to the remote computing device comprises characteristic information of operating system software installed within the remote computing device.

5. The method of claim 4 wherein the characteristic information of operating system software installed within the remote computing device comprises information indicating update-status with respect to operating system software.

6. The method of claim 1 wherein generating the security score based at least in part on the characteristic data comprises generating a score in which individual components of the characteristic data have different weights indicative of risk assessment.

7. The method of claim 1 further comprising denying the remote computing device access to the feature of the digital network if the security score does not exceed the access threshold.

8. The method of claim 1 wherein the feature of the digital network further comprises at least one of a data base or a web service.

9. The method of claim 1 wherein obtaining characteristic data corresponding to the remote computing device further comprises executing the security scan of a local network through which the remote computing device seeks to access to the feature of the digital network to assess the vulnerabilities of the local network.

10. The method of claim 9 wherein generating the security score comprises generating the security score based at least in part on the vulnerabilities of the local network.

11. The method of claim 1 wherein obtaining characteristic data corresponding to the remote computing device further comprises obtaining data from the remote computing device indicative of security training of a user of the remote computing device.

12. The method of claim 11 wherein generating the security score comprises generating the security score based at least in part on security training of the user of the remote computing device.

13. The method of claim 1 wherein obtaining characteristic data corresponding to the remote computing device further comprises obtaining data from the remote computing device indicative of third-party software installed on the remote computing device.

14. The method of claim 13 wherein generating the security score comprises generating the security score based at least in part on third-party software indicated to be installed on the remote computing device.

15. The method of claim 1 further comprising performing statistical modeling based on the characteristic data.

16. The method of claim 15, wherein the statistical modeling comprises a weighted average calculation.

17. The method of claim 1 further comprising calling an application programming interface (API) to perform device validation of the remote computing device.

18. The method of claim 1 further comprising ensuring the remote computing device meets a minimum cybersecurity compliance policy requirement.

19. The method of claim 6, wherein the different weights indicative of risk assessment comprise a set of configurable weights.

* * * * *